United States Patent

[11] 3,630,230

[72] Inventor Kurt Stahle
   Heimsheim/Leonberg, Germany
[21] Appl. No. 55,783
[22] Filed July 17, 1970
[45] Patented Dec. 28, 1971
[73] Assignee Jos. Schneider & Co.
   Bad Kreuznach, Germany
[32] Priority Oct. 21, 1969
[33] Germany
[31] P 19 52 811.1
   Continuation-in-part of application Ser. No. 758,325, Sept. 9, 1968, now Patent No. 3,543,648. This application July 17, 1970, Ser. No. 55,783

[54] FLUID VALVE WITH CONTROLLED AXIAL THRUST
   7 Claims, 6 Drawing Figs.
[52] U.S. Cl. ................................................ 137/625.4, 251/282
[51] Int. Cl. ............................................................ F16k 11/07

[50] Field of Search............................................ 137/625.4, 625.6, 625.61, 625.62, 625.66, 625.67; 251/118, 127, 282

[56] References Cited
UNITED STATES PATENTS
2,566,051 8/1951 Avery ........................... 251/282 X
2,933,106 4/1960 Gerwig et al .................. 137/625.62
2,952,275 9/1960 Mock .......................... 137/625.48 X
FOREIGN PATENTS
558,363 1/1944 Great Britain ................ 137/625.69

Primary Examiner—Henry T. Klinksiek
Attorney—Karl F. Ross

ABSTRACT: To control the axial thrust due to dynamic pressures reacting upon the piston of a fluid valve when the latter moves toward an open-valve position, a fixed barrier is interposed between two oppositely facing lands of a pair of piston heads at least one of which has an edge alternately blocking and unblocking an inlet port for the fluid. The baffle may be divided into two or more ring segments separated by small gaps from one another and from the piston surface.

Kurt Stähle
INVENTOR.

BY
Karl F. Ross
Attorney

Kurt Stähle
INVENTOR.

BY
Karl J. Ross
Attorney

FLUID VALVE WITH CONTROLLED AXIAL THRUST

This application is a continuation-in-part of my copending application Ser. No. 758,325, now U.S. Pat. No. 3,543,648.

In that earlier application and patent I have disclosed a fluid-operated servosystem wherein a valve piston, in response to a relatively small controlling force, executes an axial stroke for starting, stopping or reversing the flow of a controlled fluid.

If the valve piston is to control the fluid flow from two axially spaced inlet ports to respective outlet ports, or to a common outlet port, the two piston heads serving for the alternate cutoff of the two fluid streams are generally of like diameter and separated by a peripheral recess axially traversed by the flowing fluid. The static fluid pressures developed in such a recess then exactly balance each other, yet the axial component of the dynamic pressure of the flow has an unsymmetrical effect which tends to shift the piston in the direction of the flow. Such a shift, occurring upon the incipient unblocking of an inlet part by the associated piston head, promptly tends to reblock that inlet so that an unstable, oscillatory condition may arise.

The system of my above-identified application and patent, in which the piston is subject to the axial force of a controlling fluid acting differentially upon its ends, may include deflecting means received in the recess between the piston heads for preventing the existence of such an unstable condition and, in fact, for reversing the axial thrust of the controlled fluid to accelerate the response of the piston to a controlling pressure differential. The present application is more specifically directed to an advantageous construction of such deflecting means.

In accordance with this invention, the aforesaid deflecting means comprises one or more stationary baffle elements projecting, at a location beyond the axial flow path of a fluid admitted through an inlet port unblocked by one piston head, into the space between the two heads for shielding the other head from the impact of the fluid stream, preferably with maintenance of a small gap around the piston to preserve the static equilibrium.

If the heads are substantially centered on the piston axis, i.e., if the intervening recess is annular, the baffle or deflecting means should also be annular and may be constituted by a plurality of approximately complementary ring elements. These segments may be inserted through radial openings in the piston cylinder and may be anchored to the cylinder by extensions wedged into these openings. Advantageously, particularly in a symmetrical system in which a common outlet port is flanked by two inlet ports alternately communicating with it, the baffle element or elements may be mounted in the outlet port itself, preferably in its midplane, so as to intercept the oncoming fluid flow from either inlet. The outlet port may then be formed by a plurality of peripherally spaced apertures in the cylinder wall, each receiving an extension of a respective ring segment.

The invention will be described in greater detail hereinafter with reference to the accompanying drawings in which.

Figure 1:
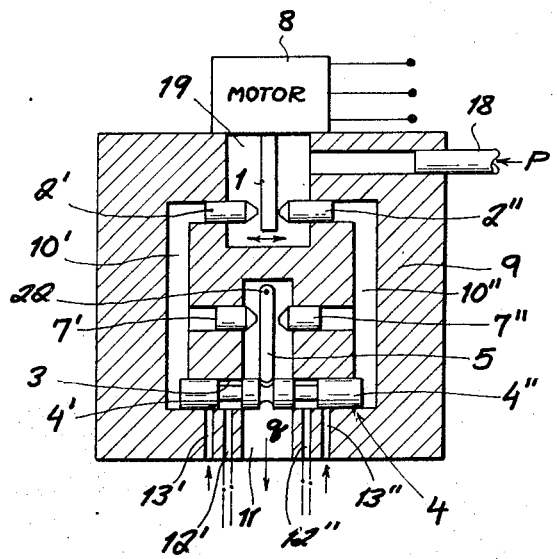
FIG. 1 is a cross-sectional view of a flow regulator utilizing a piston valve for the alternate blocking and unblocking of two fluid streams.

In FIG. 1, I have shown a solid body 9 formed with a cylindrical bore 3 to accommodate a valve piston 4, this bore communicating with five ports 11, 12', 12", 13' and 13" which form part of a conduit system including a reciprocable load operated by the piston 4. The load may be a hydraulic or pneumatic jack of the double-acting type alternately receiving fluid via output ports 12' and 12". The ends of bore 3 are connected by way of respective channels 10', 10" to a pair of nozzle-shaped inlets 2', 2" confronting each other across a narrow gap. Disposed within this gap for translational or pivotal movement toward either inlet 2' or 2" is a tongue-shaped control element 1 to which motion may be imparted by a motor 8 in response to an input signal from an actuator not shown. A source of control fluid (e.g., oil) under pressure, represented by an arrow P, is connected via a pipe 18 with a space 19 containing the tongue 1 and the inlets 2', 2".

The two outermost ports 13', 13" serve to admit a flow of controlled fluid $q$ which may be obtained from the same source as the controlling fluid in space 19 and which is discharged through the central port 11 to a sump, to the intake side of an oil pump or to some other low-pressure region. Channels 10' and 10" have outlets 7', 7" disposed in parallel with inlets 2', 2" and confronting each other across a gap receiving a blocking member 5 which may be generally similar to tongue 1 and is pivotable about a fixed fulcrum 22, its free end being mechanically connected with piston 4. The space accommodating the blocking member 5 and the outlets 7', 7" forms an extension of discharge port 11.

Upon a movement of tongue 1 to, say, the left under the control of motor 8, the influx of pressure fluid into channel 10' via nozzle 2' will be throttled so that a pressure differential is developed in bore 3 across piston 4 as long as member 5 is disposed symmetrically between outlets 7' and 7", this pressure differential tending to shift the piston toward the left with a corresponding swing of member 5 in the same sense to overlie the associated outlet 7' with consequent restoration of the pressure equilibrium in cylinder bore 3. It will be noted that tongue 1 needs to move only over a very short distance to produce a relatively large displacement of piston 4 and that the blocking stroke of member 5, close to its pivot 22, is also a fraction of the piston movement.

In analogous manner, a reversal of tongue 1 by motor 8 will drive the piston to the right, with consequent partial obstruction of outlet 7" to restore the pressure balance acting upon piston ends 4' and 4".

When the piston moves to the left, fluid $q$ is allowed to pass from inlet 13' to outlet 12'. Under static conditions, i.e., when the load has reached the limit of its stroke induced by this fluid flow, the fluid pressure in the space between piston end 4' and the central part of the piston will be balanced so that no axial force from the controlled fluid will be superimposed upon the controlling pressure differential. At the beginning of the flow, however, the rush of fluid from inlet 13' to outlet 12' will generate an axial thrust tending to shift the piston to the right, thereby causing its head 4' to reblock the inlet 13'. Analogous conditions exist, of course, at the inlet 13" and outlet 12" upon a rightward displacement of the piston.

When the piston 4 reaches one or the other of its limiting positions, the fluid previously delivered to the load (e.g. the aforedescribed double-acting hydraulic jack) in the alternate piston position is returned to the sump by flowing from the intermediate port 12' or 12" to the discharge port 11. Thus, with the piston 4 displaced toward the right, port 12' becomes the inlet whereas port 11 acts as the outlet. In this case, too, the dynamic fluid pressure will tend to shift the piston in an inlet-blocking direction if such shift were not prevented by contact between, say, piston head 4" and the end wall of bore 3.

Figure 2:
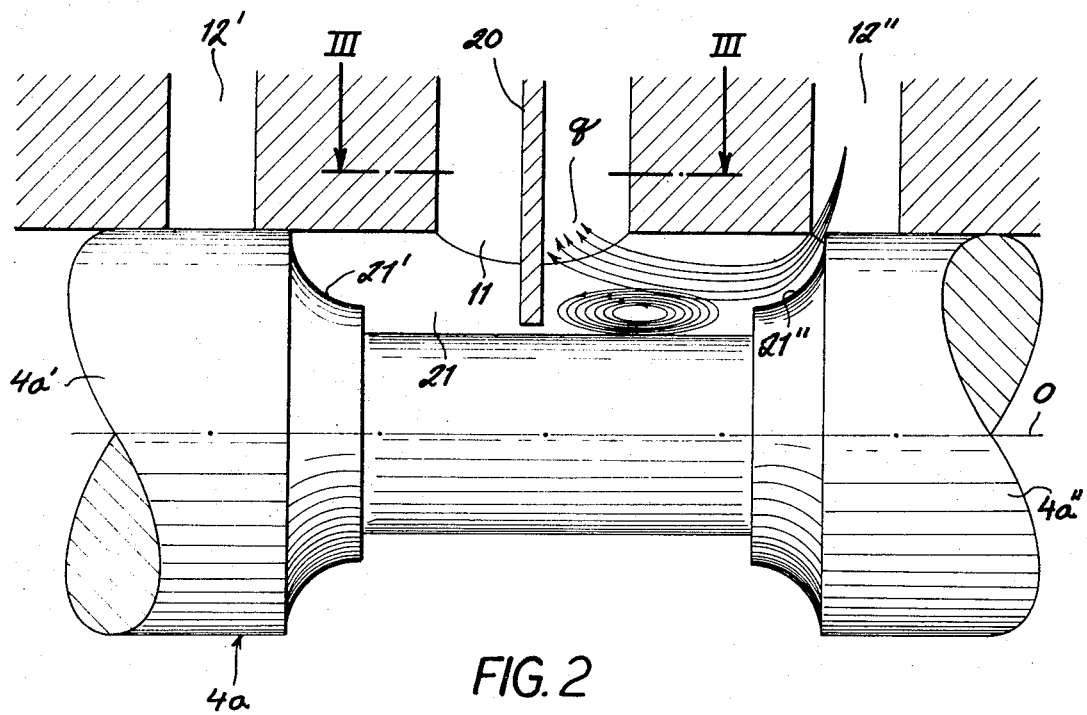
FIG. 2 is an enlarged detail view of a piston valve, modified in accordance with the present invention, for the system of FIG. 1.
Figure 3:
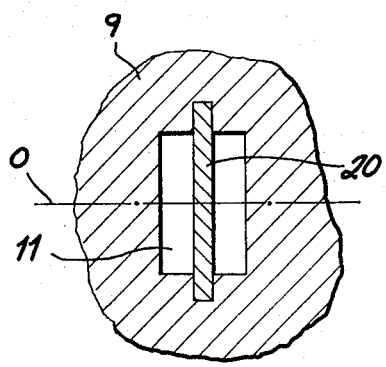
FIG. 3 is a cross-sectional view taken on the line III—III of FIG. 2.

In FIGS. 2 and 3, I have shown a way of deriving from the controlled flow $q$ an axial thrust aiding instead of opposing the displacement of a piston $4a$ by the aforedescribed pressure differential so as to accelerate the shift of the piston in the desired direction.

A peripheral recess 21 of piston $4a$, separating the lands $4a'$ and $4a''$ which form a pair of enlarged heads similar to the large-diameter sections of piston 4 in FIG. 1, is shown subdivided by a stationary baffle plate 20 extending midway within the discharge port 11. Piston $4a$ is shown displaced toward the right so that the working edge of head 4a" unblocks the port 12" now serving as an outlet. In the absence of baffle plate 20, fluid q would impinge upon the confronting face of head 4a' and would create a dynamic force tending to shift the piston back to its midposition, thereby closing the port 12". Plate 20, however, diverts this flow into the discharge port 11 while a flared edge 21" of head 4a" generates a rightward axial thrust helping to open the port 12". The corresponding edge 21' of head 4a' is similarly flared to create an analogous leftward thrust when the piston 4a is shifted to let fluid flow from port 12' to port 11.

As shown in FIG. 3, the discharge port 11 of housing 9 may be of rectangular cross section with a pair of confronting recesses to accommodate the baffle plate 20.

Figure 4:
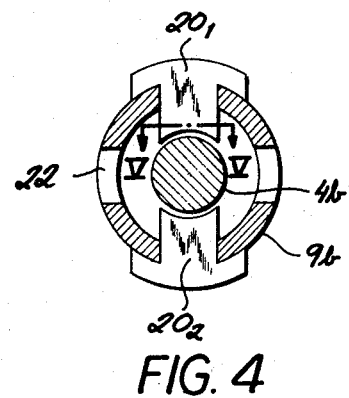
FIG. 4 is a cross-sectional view of a piston-and-cylinder assembly generally similar to that of FIG. 2.
Figure 5:
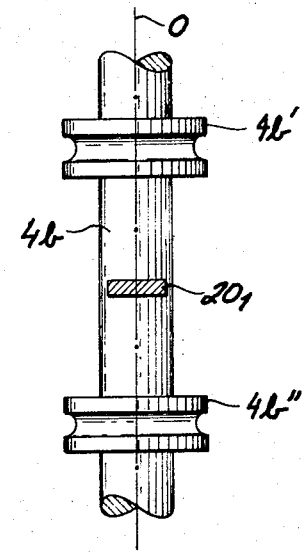
FIG. 5 is a top view of the piston of FIG. 4 and an associated baffle segment shown in section on the line V—V thereof.

FIGS. 4 and 5 show a piston 4b with heads 4b', 4b" separated by a reduced portion surrounded with all-around clearance by the associated cylinder 9b. The discharge port is here constituted by four peripherally equispaced openings 22, two of which are shown bisected in FIG. 4 by respective deflectors or baffle segments $20_1$, $20_2$ each generally similar to plate 20 of FIGS. 2 and 3. Similar deflectors, not shown, can be fitted into the two remaining openings in order to obstruct the major part of the annular space around the piston.

Figure 6:
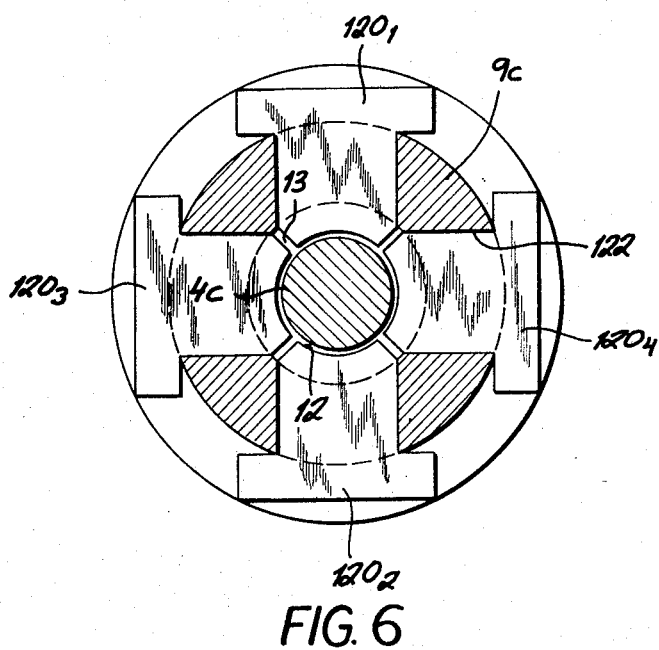
FIG. 6 is a view similar to FIG. 4, illustrating a modification.

As shown in FIG. 6, a piston 4c similar to piston 4b is received in a cylindrical housing 9c whose peripherally equispaced apertures 122 are so wide that baffle segments $120_1$, $120_2$, $120_3$, $120_4$ respectively inserted therein are mutually separated by narrow peripheral gaps 13, the width of each gap being comparable to that of the annular clearance 12 between the piston and the baffle segments. These segments, therefore, complement one another within the cylinder space to a substantially continuous ring effectively blocking axial flow, as described with reference to FIG. 2, while still permitting equalization of static pressure on both sides of the baffle.

It will be understood that the baffles described and illustrated could also be positioned, for example, just to the right of port 12' and just to the left of port 12" in FIG. 1 if it were not necessary to reverse the fluid stream through these ports for discharge through a central port 11, i.e., if ports 12' and 12" were connected to respective turbines, blowers or other unidirectionally driven loads.

I claim:
1. A valve for the control of a fluid flow, comprising:
    a cylinder having at least one inlet port and at least one outlet port opening at axially spaced locations into an axial bore of substantially constant diameter;
    a piston in said bore with a pair of heads separated by an axial distance greater than that of said inlet and outlet ports, one of said heads having an edge alternately blocking and unblocking a path from said inlet port to said outlet ports upon an axial shifting of said piston; and
    stationary baffle means disposed substantially in line with said ports at a location beyond said path and projecting into the space between said heads for shielding the other of said heads from the impact of a fluid stream passing axially from said inlet port toward said outlet port upon a partial unblocking of the former, thereby generating a thrust tending to accelerate a shifting of said piston in the unblocking direction.
2. A valve as defined in claim 1 wherein said cylinder has a second inlet port disposed opposite the first inlet port with reference to said outlet port for alternate blocking and unblocking by an edge of said other of said heads, said baffle means being disposed substantially in a midplane of said outlet port for subdividing same into two compartments respectively receiving fluid from said inlet ports.
3. A valve defined in claim 2 wherein said edges of said heads are flared for deviating a radial influx of fluid from the respective inlet ports into an axial fluid stream directed toward said baffle means.
4. A valve as defined in claim 1 wherein said baffle means comprises a plurality of peripherally spaced segments extending radially from the wall of said bore toward the piston surface.
5. A valve as defined in claim 4 wherein said segment complement one another to a substantially continuous ring surrounding said piston with small clearance.
6. A valve as defined in claim 5 wherein said outlet port includes a plurality of peripherally spaced openings in the wall of said cylinder, said segments having radial extensions respectively wedged into said openings.
7. A valve ad defined in claim 5 wherein said segments are separated from one another by small peripheral gaps.

* * * * *